(12) United States Patent
Kato

(10) Patent No.: US 8,849,093 B2
(45) Date of Patent: Sep. 30, 2014

(54) THUMBNAIL GENERATING APPARATUS AND THUMBNAIL GENERATING METHOD

(75) Inventor: Daisaku Kato, Kanagawa-ken (JP)

(73) Assignee: JVC Kenwood Coorporation, Yokohama-shi, Kanagawa (JP)

( * ) Notice: Subject to any disclaimer, the term of this patent is extended or adjusted under 35 U.S.C. 154(b) by 0 days.

(21) Appl. No.: 13/259,685

(22) PCT Filed: Jan. 28, 2010

(86) PCT No.: PCT/JP2010/051100
§ 371 (c)(1),
(2), (4) Date: Sep. 23, 2011

(87) PCT Pub. No.: WO2010/109943
PCT Pub. Date: Sep. 30, 2010

(65) Prior Publication Data
US 2012/0020643 A1 Jan. 26, 2012

(30) Foreign Application Priority Data
Mar. 25, 2009 (JP) ................ P2009-073345

(51) Int. Cl.
| | | |
|---|---|---|
| H04N 9/80 | (2006.01) | |
| H04N 21/433 | (2011.01) | |
| H04N 21/44 | (2011.01) | |
| H04N 21/482 | (2011.01) | |
| G11B 27/034 | (2006.01) | |
| H04N 21/432 | (2011.01) | |
| H04N 5/262 | (2006.01) | |
| G11B 27/28 | (2006.01) | |
| H04N 21/4402 | (2011.01) | |
| H04N 21/4223 | (2011.01) | |
| H04N 5/77 | (2006.01) | |
| H04N 9/82 | (2006.01) | |
| H04N 9/804 | (2006.01) | |
| H04N 21/8549 | (2011.01) | |

(52) U.S. Cl.
CPC .......... *H04N 5/2624* (2013.01); *H04N 21/4223* (2013.01); *H04N 21/4334* (2013.01); *H04N 21/44008* (2013.01); *H04N 21/482* (2013.01); *G11B 27/034* (2013.01); *H04N 21/4325* (2013.01); *G11B 27/28* (2013.01); *H04N 5/772* (2013.01); *H04N 9/8227* (2013.01); *H04N 21/440263* (2013.01); *H04N 9/8042* (2013.01); *H04N 9/8205* (2013.01); *H04N 21/44029* (2013.01); *H04N 21/8549* (2013.01)
USPC .......................................................... 386/241

(58) Field of Classification Search
CPC .. G11B 27/105; G11B 27/329; G11B 27/034; H04N 5/85; H04N 9/8042
See application file for complete search history.

(56) References Cited

U.S. PATENT DOCUMENTS

| | | |
|---|---|---|
| 2006/0064716 A1 | 3/2006 | Sull et al. |
| 2008/0131073 A1* | 6/2008 | Ogawa et al. .................. 386/52 |
| 2008/0136937 A1 | 6/2008 | Murakoshi |
| 2009/0091633 A1* | 4/2009 | Tamaru .................. 348/208.14 |

FOREIGN PATENT DOCUMENTS

| | | |
|---|---|---|
| JP | 07-046582 A | 2/1995 |
| JP | 2002-223412 A | 8/2002 |
| JP | 2005-210573 A | 8/2005 |
| JP | 2005-269563 A | 9/2005 |
| JP | 2008-147838 A | 6/2008 |

OTHER PUBLICATIONS

European Search Report, Application No. EP 10 75 5744, issued Jan. 8, 2013, six (6) pages.

* cited by examiner

*Primary Examiner* — William C Vaughn, Jr.
*Assistant Examiner* — Daniel Tekle
(74) *Attorney, Agent, or Firm* — Nath, Goldberg & Meyer; Jerald L. Meyer; Leonid D. Thenor

(57) ABSTRACT

A thumbnail generating apparatus includes a moving image extracting portion, a reduction and enlargement ratio calculating portion and a reducing and enlarging unit. The moving image extracting portion extracts a moving image corresponding to a period shorter than a reproduction time of moving image based on the number and area of face detection regions obtained from face detection information generated by detecting a face of person included in the moving image. The reduction and enlargement ratio calculating portion integrates the face detection regions at intervals of certain time based on the face detection information of the moving image extracted by the moving image extracting portion, and calculates a reduction and enlargement ratio of the moving image based on the integration result such that a face of person included in the moving image extracted by the moving image extracting portion is largely displayed. The reducing and enlarging unit reduces or enlarges the moving image extracted by the moving image extracting portion based on the reduction and enlargement ratio calculated by the reduction and enlargement ratio calculating portion to generate a moving image thumbnail.

7 Claims, 13 Drawing Sheets

FIG. 4
(a)
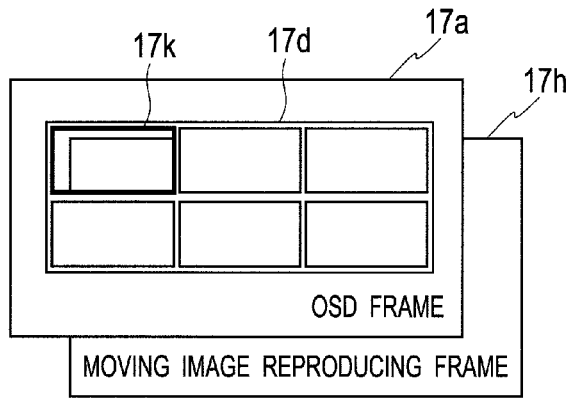
(b)
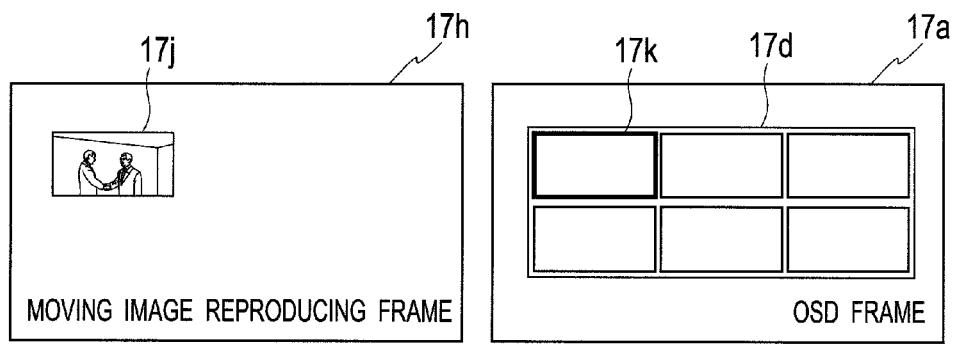
(c)
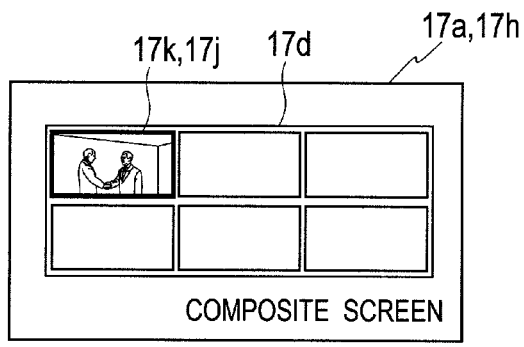

FIG. 5

| REPRODUCTION TIME OF MOVING IMAGE (SECOND) /101 | REPRODUCTION TIME OF MOVING IMAGE THUMBNAIL (SECOND) (=UNIT DIVISION TIME × NUMBER OF SECTIONS) /102 | NUMBER OF REPRODUCTION SECTIONS OF MOVING IMAGE THUMBNAIL /103 |
|---|---|---|
| WITHIN LESS THAN 30 SECONDS | 10 SECONDS (= 5 SECONDS × 2 SECTIONS) | 2 |
| WITHIN MORE THAN 30 SECONDS AND LESS THAN 60 SECONDS | 15 SECONDS (=5 SECONDS × 3 SECTIONS) | 3 |
| WITHIN MORE THAN 60 SECONDS AND LESS THAN 120 SECONDS | 20 SECONDS (= 5 SECONDS × 4 SECTIONS) | 4 |
| WITHIN MORE THAN 120 SECONDS AND LESS THAN 180 SECONDS | 25 SECONDS (= 5 SECONDS × 5 SECTIONS) | 5 |
| WITHIN MORE THAN 180 SECONDS | 30 SECONDS (= 5 SECONDS × 6 SECTIONS) | 6 |

US 8,849,093 B2

THUMBNAIL GENERATING APPARATUS AND THUMBNAIL GENERATING METHOD

This is a National Phase Application filed under 35 U.S.C. 371 as a national stage of PCT/JP2010/051100, filed Jan. 28, 2010, and claiming the benefit from Japanese Application No. P2009-073345, filed Mar. 25, 2009, the content of which is hereby incorporated by reference in its entirety.

TECHNICAL FIELD

The present invention relates to a thumbnail generating apparatus and a thumbnail generating method for generating a moving image thumbnail aimed at helping a user to perceive contents of a moving image to be reproduced by a reproducing apparatus.

BACKGROUND ART

A video camera with still image thumbnail display function is well known. The video camera extracts any one of frames or fields constituting a recorded moving image and reduces it's size, generates it as a still image thumbnail every a recorded moving image or a certain chapter in the recorded moving image, and displays as a thumbnail list screen these generated still image thumbnails on a liquid crystal panel for monitor mounted on a main body thereof.

For example, as a technique aimed at helping a user to perceive contents of an image associated with a still image thumbnail, a patent document 1 proposes an image processing apparatus that detects a person's face from a recorded still image, reduces the recorded still image to a certain size to which the detected person's face is fitted, and generates it as a still image thumbnail.

However, while the technique disclosed in the patent document 1 helps a user to perceive contents of an image associated with a still image thumbnail in comparison with the conventional still image thumbnail display function, if an image associated with the still image thumbnail is a moving image, there is a case where a user can not perceive contents of the moving image because the displayed thumbnail is a still image.

Meanwhile, there are many cases where an HDD (Hard Disk Drive) recorder or a DVD (Digital Versatile Disk) recorder has motion thumbnail function for, when a focus (highlight frame) is matched to one still image thumbnail on a thumbnail list screen by a user's operation, displaying a moving image thumbnail instead of the still image thumbnail. The motion thumbnail function reproduces a moving image associated with the selected still image thumbnail during a certain period of time, generates a moving image thumbnail in which the reproduced moving image is reduced to the same size as the still image thumbnail, and displays the generated moving image thumbnail on a region of the corresponding still image thumbnail in a still image thumbnail list screen. A user is easy to perceive contents of the moving image by watching the moving image thumbnail displayed by the motion thumbnail function.

CITATION LIST

Patent Literature

Patent document 1: Japanese Patent Application Laid-open Publication No. 2005-269563

SUMMARY OF INVENTION

Technical Problem

It is considered to apply this motion thumbnail function to a video camera.

However, in a case where the motion thumbnail function is applied to a video camera, since a liquid crystal panel for monitor mounted on a main body thereof has a relatively small screen, a moving image thumbnail to be displayed on a thumbnail list screen is small. This makes it difficult for a user to perceive contents of the moving image thumbnail (that is, contents of a moving image associated with the moving image thumbnail).

The present invention is invented in view of the above problem and has an object to provide a thumbnail generating apparatus and a thumbnail generating method for generating a moving image thumbnail aimed at helping a user to perceive contents of a moving image recorded in a recording and reproducing apparatus and displaying the moving image thumbnail.

Solution to Problem

In order to achieve the above object, a thumbnail generating apparatus according to the present invention has a first feature in which the thumbnail generating apparatus comprises: a moving image extracting portion that, within a first certain period of a moving image, extracts each of images constituting the moving image every a second certain period shorter than the first certain period; a reduction and enlargement ratio calculating portion that integrates regions each where there is a face of person included in each of the extracted images, determines a face display region such that the face display region surrounds the integrated regions each where there is a face of person, and calculates a reduction and enlargement ratio of the moving image such that the determined face display region has substantially the same size as a certain display region previously set where a moving image thumbnail is to be displayed; and a moving image thumbnail generator that reduces or enlarges the moving image based on the calculated reduction and enlargement ratio to generate the moving image thumbnail.

In order to achieve the above object, the thumbnail generating apparatus according to the present invention has a second feature in which the thumbnail generating apparatus further comprises a thumbnail section determining portion that determines one or more first certain periods based on the number of successive images each of which has a region where there is a face of person, among the images extracted by the moving image extracting portion.

In order to achieve the above object, the thumbnail generating apparatus according to the present invention has a third feature in which the reduction and enlargement ratio calculating portion that, if a value of ratio calculated by setting as denominator a value of area of the face display region and setting as numerator a value of total area of the regions each where there is a face of person is smaller than a certain threshold, the reduction and enlargement ratio calculating portion sets as a representative region a region where there is a face of person, which is located near the center and has the largest area among the regions each where there is a face of person, and calculates the reduction and enlargement ratio such that the representative region has substantially the same size as the display region.

In order to achieve the above object, the thumbnail generating apparatus according to the present invention has a fourth feature in which the thumbnail generating apparatus further comprises a facial feature information storing unit that stores as facial feature information a facial feature for uniquely identifying a face of person, wherein the reduction and enlargement ratio calculating portion determines whether or not a facial feature in the regions each where there is a face of person is the same as or similar to a facial feature represented by the facial feature information stored in the facial feature information storing unit, and if the facial feature is the same as or similar to the facial feature represented by the facial feature information, the reduction and enlargement ratio calculating portion calculates the reduction and enlargement ratio such that a region where there is a face of person corresponding to the facial feature being the same as or similar to the facial feature represented by the facial feature information has substantially the same size as the display region.

In order to achieve the above object, a thumbnail generating method according to the present invention has a first feature in which the thumbnail generating method comprises: a moving image extracting step of, within a first certain period of a moving image, extracting each of images constituting the moving image every a second certain period shorter than the first certain period; a reduction and enlargement ratio calculating step of integrating regions each where there is a face of person included in each of the extracted images, determining a face display region such that the face display region surrounds the integrated regions each where there is a face of person, and calculating a reduction and enlargement ratio of the moving image such that the determined face display region has substantially the same size as a certain display region previously set where a moving image thumbnail is to be displayed; and a moving image thumbnail generating step of reducing or enlarging the moving image based on the calculated reduction and enlargement ratio to generate the moving image thumbnail.

Advantageous Effects of Invention

According to the thumbnail generating apparatus and the thumbnail generating method of the present invention, it is possible to generate a moving image thumbnail aimed at helping a user to perceive contents of a moving image recorded in a recording and reproducing apparatus and display the moving image thumbnail.

BRIEF DESCRIPTION OF DRAWINGS

FIG. [1] It is a configuration diagram that illustrates a configuration of a video camera recording on a recording medium an AV stream and stream management information to be supplied to a thumbnail generating apparatus according to a first exemplary embodiment of the present invention.

FIG. [2] It is a configuration diagram that illustrates a configuration of the thumbnail generating apparatus according to the first exemplary embodiment of the present invention.

Figure 1:
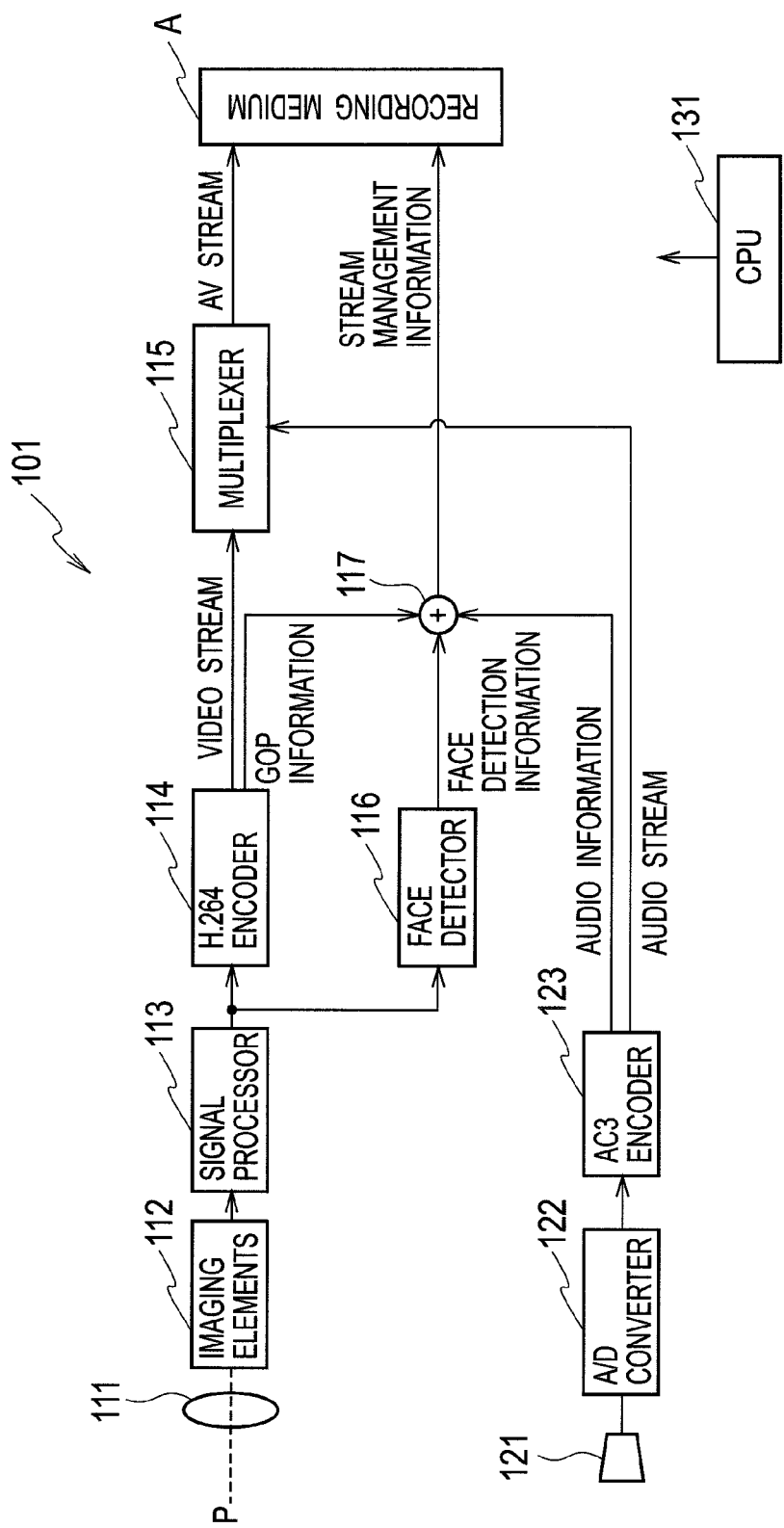

FIG. [3] It is an explanatory diagram that illustrates one example of a screen displayed by a user interface with which the thumbnail generating apparatus is provided according to the first exemplary embodiment of the present invention.

FIG. [4] They are explanatory diagrams that illustrate superposition of an OSD frame and a moving image reproducing frame on the user interface with which the thumbnail generating apparatus is provided according to the first exemplary embodiment of the present invention. The (a) is an explanatory diagram that illustrates an order of superposition of the OSD frame and the moving image reproducing frame. The (b) is an explanatory diagram that illustrates one example of the OSD frame and one example of the moving image reproducing frame. The (c) is an exemplary diagram that illustrates one example of a composite screen in which the moving image reproducing frame overlaps with the OSD frame.

FIG. [5] It is an explanatory diagram that illustrates one example of moving image thumbnail time information stored in a moving image thumbnail time storing unit with which the thumbnail generating apparatus is provided according to the first exemplary embodiment of the present invention.

FIG. [6] It is a flowchart that illustrates face detecting processing in a face detector with which the video camera is provided.

FIG. [7] It is a flowchart that illustrates moving image extracting processing in the thumbnail generating apparatus according to the first exemplary embodiment of the present invention.

FIG. [8] It is an explanatory diagram that illustrates processing in which a moving image extracting portion of the thumbnail generating apparatus extracts a "face-having-section lasting for unit division time" according to the first exemplary embodiment of the present invention.

FIG. [9] It is a flowchart that illustrates moving image thumbnail displaying processing in the thumbnail generating apparatus according to the first exemplary embodiment of the present invention.

FIG. [10] They are explanatory diagrams that illustrate calculation of an area "A" of rectangular region, which has an aspect ratio 16:9, surrounding face detection regions by a reduction ratio calculating portion of a CPU with which the thumbnail generating apparatus is provided according to the first exemplary embodiment of the present invention. The (a) is an explanatory diagram that illustrates face detection regions during a certain section from a time point "t1" to a time point "t5". The (b) is an explanatory diagram that illustrates a moving image in a situation where the face detection regions shown in (a) are integrated. The (c) is an explanatory diagram that illustrates a moving image in a situation where the face detection regions disperse therein. The (d) is an explanatory diagram that illustrates a moving image in a situation where the face detection regions thicken therein.

FIG. [11] They are explanatory diagrams that illustrate calculation of a reduction ratio of a moving image by the reduction ratio calculating portion with which the thumbnail generating apparatus is provided according to the first exemplary embodiment of the present invention. The (a) is an explanatory diagram that illustrates one example of a moving image to be reduced. The (b) is an explanatory diagram that illustrates one example of the OSD frame.

FIG. [12] They are explanatory diagrams that illustrate calculation of a reduction ratio of a moving image by the reduction ratio calculating portion with which the thumbnail generating apparatus is provided according to the first exemplary embodiment of the present invention. The (a) is an explanatory diagram that illustrates one example of a moving image to be reduced. The (b) is an explanatory diagram that illustrates one example of the OSD frame.

FIG. [13] It is a configuration diagram that illustrates a configuration of a thumbnail generating apparatus according to a second exemplary embodiment of the present invention.

FIG. [14] It is an explanatory diagram that illustrates one example of facial feature information stored in a facial feature information storing unit with which the thumbnail generating apparatus according to the second exemplary embodiment of the present invention.

FIG. [15] They are explanatory diagrams that illustrate calculation of a reduction ratio of a moving image by a reduction ratio calculating portion with which the thumbnail generating apparatus is provided according to the second exemplary embodiment of the present invention. The (a) is an explanatory diagram that illustrates one example of a moving image to be reduced. The (b) is an explanatory diagram that illustrates one example of the OSD frame.

DESCRIPTION OF EMBODIMENTS

Exemplary embodiments of the present invention will be described below with reference to drawings.
First Exemplary Embodiment
In a first exemplary embodiment of the present invention, we cite a video camera which includes a face detector that detects a face of person based on a captured moving image, and a thumbnail generating apparatus which generates a moving image thumbnail based on an AV stream and stream management information generated by the video camera and recorded on a recording medium, as an example of the preset invention.
<Configuration of Video Camera>
FIG. 1 is a configuration diagram that illustrates a configuration of a video camera which generates an AV stream and stream management information to be used in a thumbnail generating apparatus and records them on a recording medium according to the first exemplary embodiment of the present invention.

The video camera 101 includes an optical lens 111, imaging elements 112, a signal processor 113, an H.264 encoder 114, a multiplexer 115, a face detector 116, an adder 117, a microphone 121, an A/D converter 122, an AC3 encoder 123 and a CPU 131.

The optical lens 111 has an axis P as an optical axis and focuses entering light.

The imaging elements 112 form an image based on the light focused by the optical lens 111 and converts into an electrical signal an object image formed.

By instruction of the CPU 131, the signal processor 113 generates a video signal based on the electrical signal generated by the imaging elements 112.

By instruction of the CPU 131, the H.264 encoder 114 generates a video stream and GOP (Group of picture) information based on the video signal generated by the signal processor 113.

By instruction of the CPU 131, the A/D converter 122 converts sounds collected by the microphone 121 from analog data to digital data.

By instruction of the CPU 131, the AC3 encoder 123 encodes the digital data generated by the A/D converter 122 to generate an audio stream and audio information.

By instruction of the CPU 131, the multiplexer 115 multiplexes the video stream generated by the H.264 encoder 114 and the audio stream generated by the AC3 encoder 123 to generate an AV stream complying with AVCHD standard, and records on a recording medium A the AV stream generated.

By instruction of the CPU 131, the face detector 116 carries out face detecting based on the video signal generated by the signal processor 113. More specifically, the face detector 116 samples a moving image at intervals of a predetermined face detection time based on the video signal, detects a face of person based on the moving image sampled, and supplies it to the adder 117 as face detection information.

It is noted that if a device or algorism for carrying out processing at high speed is employed, it is possible to carry out the face detecting processing frame by frame. However, if the face detecting processing is carried out frame by frame, the face detection information has an uneconomically large data size. Accordingly, it is preferable to set the face detection time to about 0.5 seconds, for example. The face detection information includes the number of face detection regions each where a face of person is detected (one of "0" to "4", "0" indicates that a face of person is not detected), a coordinate (X, Y) of the upper left of face detection region where a face of person is detected every the face detection regions each where a face of person is detected in a case where the upper left of moving image is set to a reference point, and the size (width and height) of face detection region where a face of person is detected.

Although a moving image consists of frames or fields of successive still images and the present invention may be applied to any of them, a still image is called as a frame for convenience of the following description.

The face detector 116 also calculates a degree of reliability for a face of person detected, that is a degree of reliability indicating a degree of likelihood that a detected object is a face of person, and determines whether or not the degree of reliability is equal to or more than a predetermined threshold for the degree of reliability.

By instruction of the CPU 131, the adder 117 generates stream management information including the GOP information from the H.264 encoder 114, the audio information from the AC3 encoder 123 and the face detection information from the face detector 116, and records the stream management information on the recording medium A.

The CPU 131 carries out central control of the video camera 101. More specifically, as described above, the CPU 131 controls the imaging elements 112, the signal processor 113, the H.264 encoder 114, the multiplexer 115, the face detector 116, the adder 117, the A/D converter 122 and the AC3 encoder 123.

<Configuration of Thumbnail Generating Apparatus>

Figure 2:
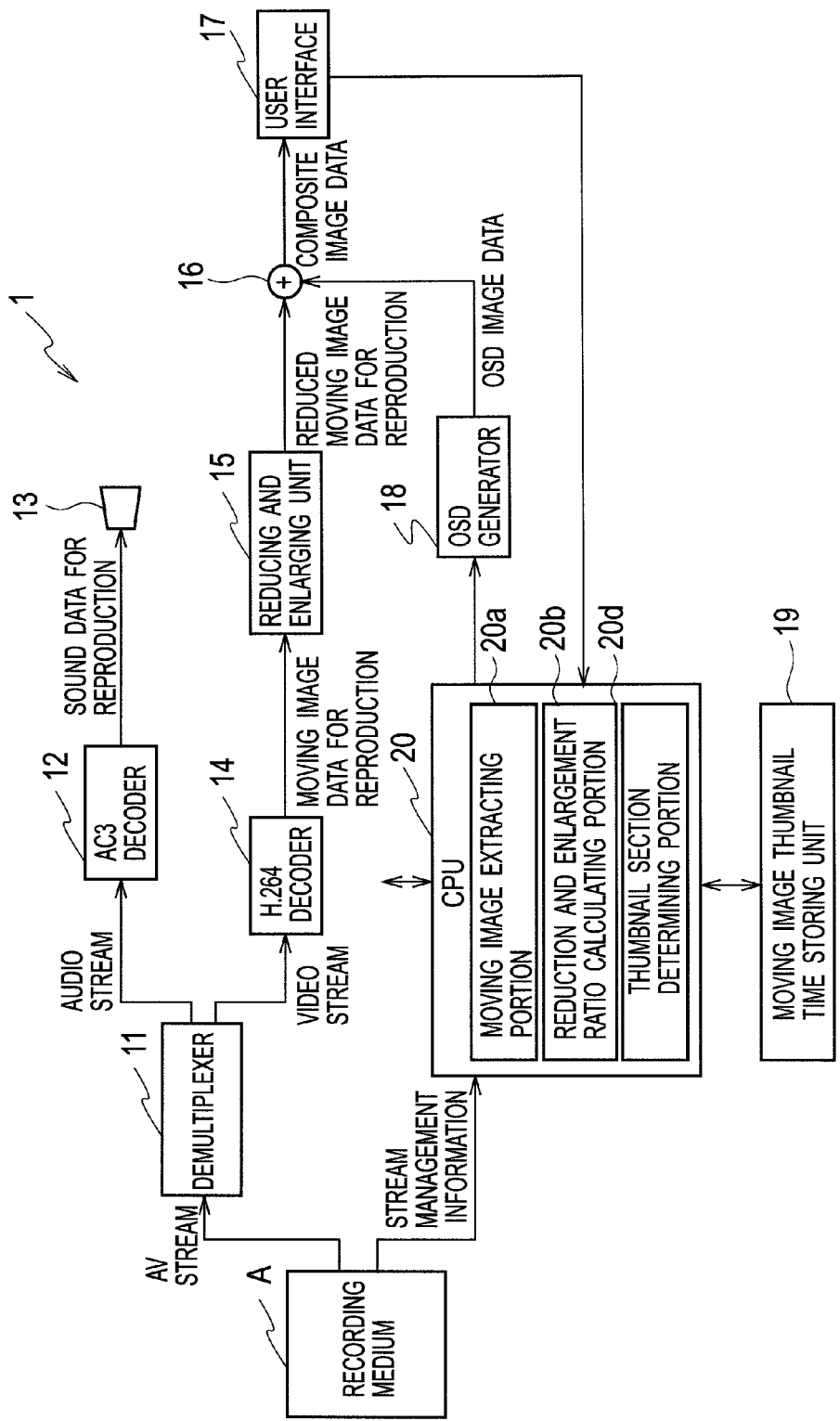

FIG. 2 is a configuration diagram that illustrates a configuration of a thumbnail generating apparatus according to the first exemplary embodiment of the present invention.

As shown in FIG. 2, the thumbnail generating apparatus 1 according to the first exemplary embodiment of the present invention includes a demultiplexer 11, an AC3 decoder 12, a speaker 13, an H.264 decoder 14, a reducing and enlarging unit 15, an adder 16, a user interface 17, an OSD generator 18, a CPU 20 and a moving image thumbnail time storing unit 19.

By instruction of the CPU 20, the demultiplexer 11 reads an AV stream recorded on the recording medium A and demultiplexer the AV stream to generate a video stream and an audio stream.

By instruction of the CPU 20, the AC3 decoder 12 decodes the audio stream from the demultiplexer 11 to generate sound data for reproduction and outputs sound from the speaker 13.

By instruction of the CPU 20, the H.264 decoder 14 decodes the video stream from the demultiplexer 11 to generate moving image data for reproduction and supplies the moving image data for reproduction to the reducing and enlarging unit 15.

By instruction of the CPU 20, the reducing and enlarging unit 15 reduces or enlarges the moving image data for reproduction from the H.264 decoder 14 to generate reduced or enlarged moving image data for reproduction to be displayed as a moving image thumbnail.

The CPU 20 carries out central control of the thumbnail generating apparatus 1. More specifically, the CPU 20 controls the demultiplexer 11, the AC3 decoder 12, the speaker 13, the H.264 decoder 14, the reducing and enlarging unit 15, the adder 16, the user interface 17 and the OSD generator 18. The CPU 20 also supplies to the OSD generator 18 stream management information read from the recording medium A.

By instruction of the CPU 20, the OSD generator 18 generates ODS image data to be used to display an OSD frame based on the stream management information and supplies it to the adder 16.

By instruction of the CPU 20, the adder 16 overlaps the reduced and enlarged moving image data for reproduction from the reducing and enlarging unit 15 with respect to the OSD image data from the OSD generator 18 to generate composite image data, and displays the composite image data on the user interface 17.

The user interface 17 includes an image display portion composed of an organic EL (electroluminescence) display, a liquid crystal display or the like. By instruction of the CPU 20, the user interface 17 displays a composite screen on the image display portion based on the composite image data from the adder 16.

The user interface 17 also includes operation portions such as operation buttons and a slider composed of touch sensors. When the operation buttons or the slider is operated by a user, the user interface 17 generates an operation signal according to the operation and supplies the operation signal to the CPU 20.

The moving image thumbnail time storing unit 19 relates a reproduction time of an moving image with a reproduction time of a moving image thumbnail according to the reproduction time of the moving image and stores them. This relation will be described later in detail.

Figure 3:
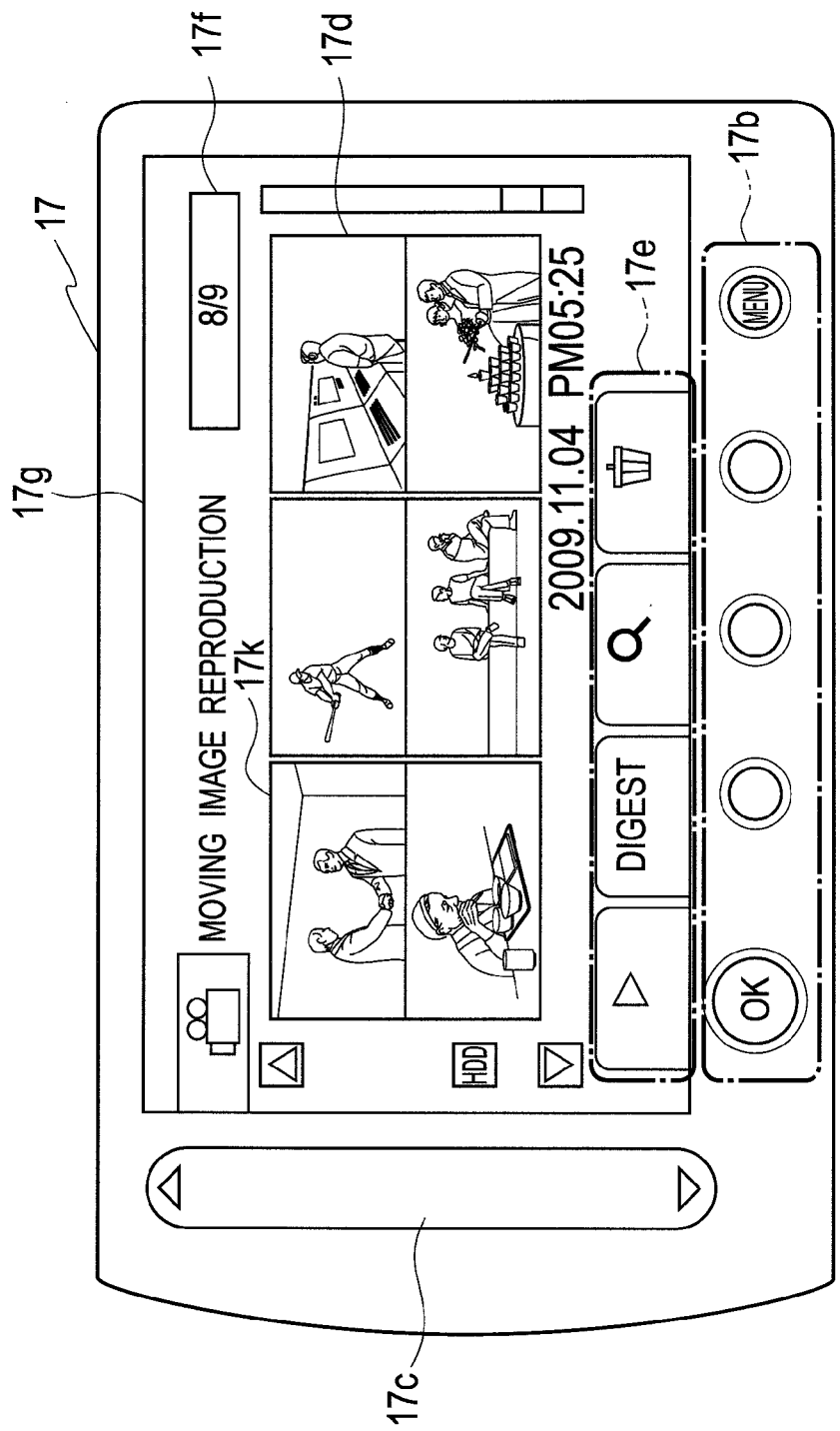

FIG. 3 is an explanatory diagram that illustrates appearance of the user interface 17 which the thumbnail generating apparatus 1 includes according to the first exemplary embodiment of the present invention, and one example of a screen displayed on the image display portion of the user interface 17.

As shown in FIG. 3, the user interface 17 includes the image display portion 17g, the operation buttons 17b and the slider 17c.

An OSD frame including a still image thumbnail generated based on OSD image data and a moving image thumbnail generated based on moving image data for reproduction reduced or enlarged by the reducing and enlarging unit 15 are overlapped each other and displayed on the image display portion 17g as a composite image.

A thumbnail display region 17d, an operation guide display region 17e and a page display region 17f are separated from one another and displayed on the OSD frame to be displayed on the image display portion 17g.

A still image thumbnail and a moving image thumbnail are displayed on the thumbnail display region 17d. This display method will be described later in detail.

Icons or the like. for indicating functions assigned to the operation buttons 17b to a user are displayed on the operation guide display region 17e.

A page of a still image thumbnail list currently displayed on the thumbnail display region 17d is displayed on the page display region 17f. For example, when "8/9" is displayed, this indicates that the total number of pages is "9" and the 8-th page is currently displayed.

In an example of FIG. 3, five operation buttons 17b are arranged. Among the five operation buttons 17b, a leftmost operation button is an OK button to be used to generate an operation signal for establishing a moving image thumbnail selected, and a rightmost operation button is a menu button to be used to generate an operation signal for displaying a menu. Fixed functions are not previously assigned to three operation buttons between these operation buttons, and the CPU 20 assigns various functions according to transition of user operation. The operation guide display region 17e is used to notify a user of a function assigned to each operation button. In the example of FIG. 3, function of digest reproduction is assigned to a left operation button, function of zoom reproduction is assigned to a middle operation button, and function of trash box is assigned to a right operation button.

The slider 17c is used to slide a highlight frame 17k which is a display region where a moving image thumbnail is displayed, as will be described below. When a user traces the slider 17c toward the lower side, the highlight frame 17k moves from left to right. When a user traces the slider 17c toward the upper side, the highlight frame 17k moves from right to left.

FIG. 4 is an explanatory diagram that illustrates a method for displaying a moving image thumbnail together with still image thumbnails.

As shown in FIG. 4(a), when a moving image thumbnail is displayed together with still image thumbnails, a moving image reproducing frame 17h and an OSD frame 17a are used.

As shown in FIG. 4(b), the CPU 20 displays the thumbnail display region 17d on the OSD frame 17a. In the thumbnail display region 17d, a list of still image thumbnails is displayed. For example, each still image thumbnail is generated by extracting an I-frame at an arbitrary position in each moving image, decoding it, and reducing or enlarging the decoded image.

In FIG. 4(b), when a user operates the slider 17c, the highlight frame 17k, which has overlapped with the left upper still thumbnail in the thumbnail display region 17d, moves to select any one of the still image thumbnails displayed in the thumbnail display region 17d.

Then, after any one of the still image thumbnails is selected, when 0.5 seconds elapses, the CPU 20 eliminates the still image thumbnail surrounded by the highlight frame 17k and provides a transparent display within the highlight frame 17k.

On the other hand, the CPU 20 reduces or enlarges moving image data for reproduction such that a moving image has the same size as the highlight frame 17k using the reducing and enlarging unit 15, generates a moving image thumbnail 17j so as to be fit to the highlight frame at a display position thereof, and provides it as the moving image reproducing frame 17h.

Then, as shown in FIG. 4(c) the CPU 20 overlaps the moving image reproducing frame 17h with respect to the back surface of the OSD frame 17a to generate a composite screen. Thereby, a moving image thumbnail 17j on the moving image reproducing frame 17h is displayed within the highlight frame 17k on the OSD frame 17a within which a transparent display is provided.

FIG. 5 is an explanatory diagram that illustrates one example of moving image thumbnail time information stored in the moving image thumbnail time storing unit 19 with which the thumbnail generating apparatus is provided according to the first exemplary embodiment of the present invention.

As shown in FIG. 5, a column name "reproduction time of moving image" (reference number "101"), a column name "reproduction time of moving image thumbnail" (reference number "102") and a column name "the number of reproduction sections of moving image thumbnail" (reference number "103") are associated with one another and stored as moving image thumbnail time information. The reproduction time of moving image thumbnail 102 is calculated by multiplying a unit division time, which will be described later, by the number of reproduction sections of moving image thumbnail 103.

The CPU 20 includes a moving image extracting portion 20a, a reduction and enlargement ratio calculating portion 20b and a thumbnail section determining portion 20d in function.

Within a first certain period of moving image, the moving image extracting portion 20a extracts each of images constituting an moving image every a second certain period shorter than the first certain period which will be described later.

The thumbnail section determining portion 20d determines one or more first certain periods based on the number of successive images each of which has a region where there is a face of person, among the images extracted by the moving image extracting portion 20a.

The reduction and enlargement ratio calculating portion 20b integrates one or more regions each where there is a face of person included in each image extracted, determines a face display region such that the face display region surrounds the one or more regions integrated each where there is a face of person, and calculates a reduction and enlargement ratio of a moving image such that the face display region determined has substantially the same size as a certain display region previously set where a moving image thumbnail is to be displayed.

In a case where a total area of face detection region with respect to an area of object face region determined is smaller than a certain threshold, the reduction and enlargement ratio calculating portion 20b calculates a reduction and enlargement ratio of a moving image such that a face detection region, which is located near the center of image and has a large area, has substantially the same size as a moving image thumbnail as a representative region.

<Working of Face Detector 116 with which Video Camera 101 is Provided>

Next, the face detecting processing carried out by the face detector 116 with which the video camera 101 is provided will be described.

Figure 6:
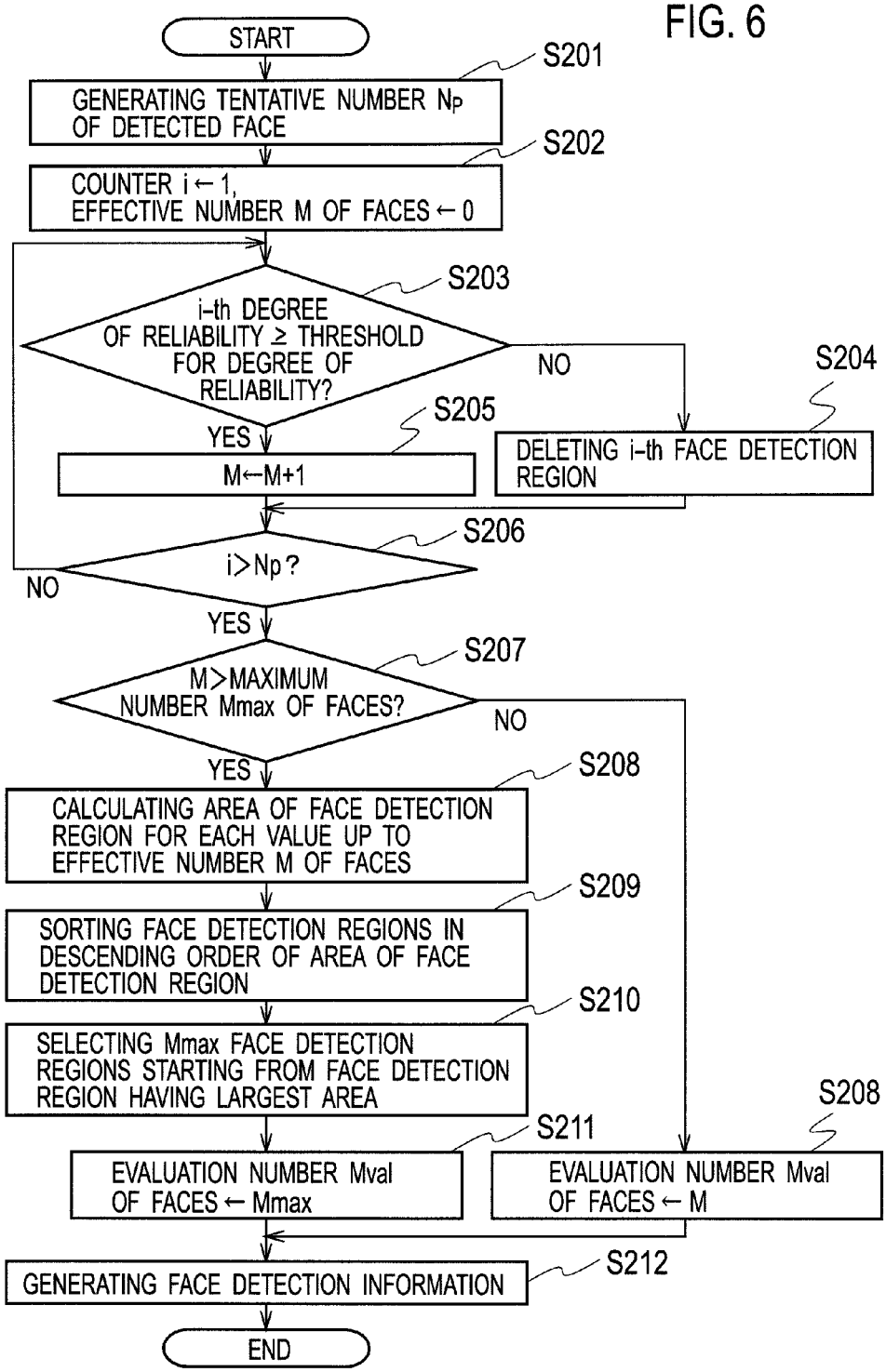

FIG. 6 is a flowchart that illustrates the face detecting processing in the face detector 116 with which the video camera 101 is provided.

As shown in FIG. 6, the face detector 116 samples a frame included in a moving image every a face detection time (second certain period: for example, 0.5 seconds) based on a video signal, detects a face of person from each sampled frame, and generates a tentative number Np of face detection regions (face regions) each where a face of person is detected (step S201).

Next, the face detector 116 assigns "1" to a counter i for a face detection region where a face of person is detected as an initial value and assigns "0" to the effective number M of faces as an initial value (step S202).

Then, the face detector 116 calculates a degree of reliability for the i-th face detection region where a face of person is detected in order of detection among the tentative number Np of face detection regions each where a face of person is detected, and determines whether or not the degree of reliability is equal to or more than a predetermined threshold for the degree of reliability (step S203). It is noted that a degree of reliability indicates a degree of likelihood that a detected object is a face of person.

In step S203, if the degree of reliability for the i-th face detection region is less than the predetermined threshold for the degree of reliability (NO), the face detector 116 deletes the i-th face detection region (step S204).

On the other hand, in step S203, if the degree of reliability for the i-th face detection region is equal to or more than the predetermined threshold for the degree of reliability (YES), the face detector 116 adds "1" to the effective number M of faces (step S205).

Next, the face detector 116 determines whether or not a value of the counter i is more than the tentative number Np of face detection regions each where a face of person is detected (step S206).

In step S206, if the value of the counter i is more than the tentative number Np of face detection regions each where a face of person is detected (YES), the face detector 116 determines whether or not the effective number M of faces is more than the maximum number Mmax of faces (step S207). It is noted that it is necessary that a provider previously calculates a proper value based on actual measurement and the provider or a user previously sets the proper value to the maximum number Mmax of faces (e.g., "4").

In step S207, if the effective number M of faces is equal to or less than the maximum number Mmax of faces (NO), the face detector 116 assigns a value of the effective number M of faces to the evaluation number Mval of faces (step S208).

On the other hand, in step S207, if the effective number M of faces is more than the maximum number Mmax of faces (YES), the face detector 116 calculates an area of face detection region for each of values up to the effective number M of faces (step S208).

Next, the face detector 116 sorts the face detection regions for values up to the effective number M of faces, in descending order of an area of face detection region calculated in the step S208 (step S209).

Then, the face detector 116 selects Mmax face detection regions starting from a face detection region having the largest area, from among the face detection regions sorted in the step S209 (step S210).

The face detector 116 further assigns the value of Mmax to the evaluation number Mval of faces (step S211).

Next, the face detector 116 generates face detection information (step S212). More specifically, the face detector 116 assigns the value of the evaluation number Mval to the number N of face detection regions each where a face of person is detected, generates face detection information including the number N of face detection regions each where a face of person is detected and coordinates (X, Y) and sizes (width, height) of N face detection regions, and supplies the face detection information to the adder 117.

According to the face detector 116 of the first exemplary embodiment of the present invention with which the video camera 101 is provided, the face detector 116 samples a moving image (frames) at intervals of the face detection time based on the video signal generated by the signal processor 113, detects a face of person based on the moving image (each frame) sampled, and supplies it to the adder 117 as face detection information. As will be described later, this allows the thumbnail generating apparatus 1 to generate a moving image thumbnail based on the face detection information.

<Working of Thumbnail Generating Apparatus 1>

Next, working of the thumbnail generating apparatus 1 of the first exemplary embodiment of the present invention will be described.

The thumbnail generating apparatus 1 of the first exemplary embodiment of the present invention mainly carries out moving image extracting processing and moving image thumbnail displaying processing in this order. Each processing will be described later in detail.

<Moving Image Extracting Processing>

The moving image extracting processing in the thumbnail generating apparatus 1 of the first exemplary embodiment of the present invention will be described in detail.

Figure 7:
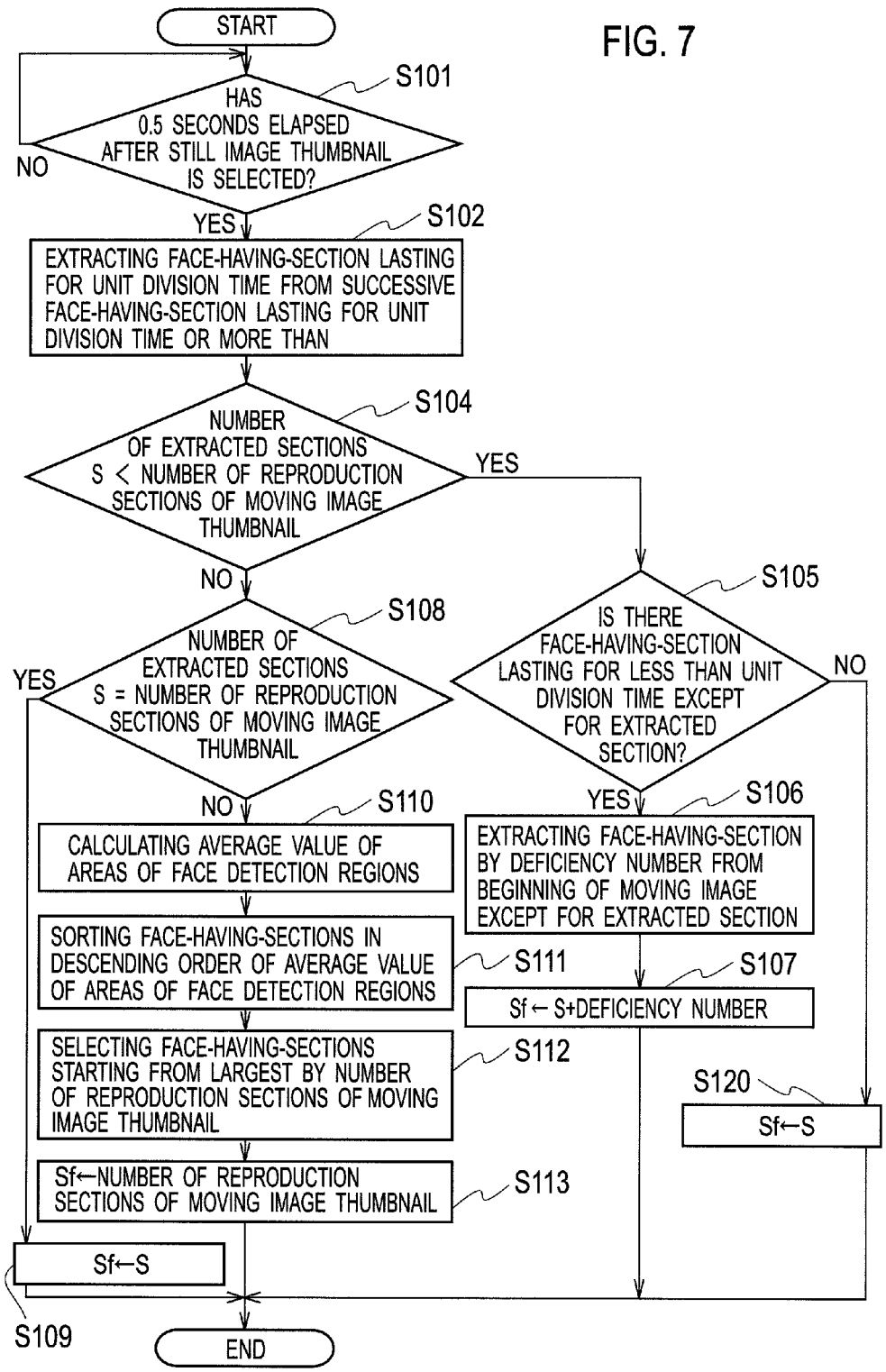

FIG. 7 is a flowchart that illustrates the moving image extracting processing in the thumbnail generating apparatus 1 according to the first exemplary embodiment of the present invention.

First, if the moving image extracting portion 20*a* of the CPU 20 determines that a predetermined time (e.g., 0.5 seconds) has elapsed after any one of the still image thumbnails is selected based on an operation signal from the user interface 17 (step S101), the thumbnail section determining portion 20*d* determines a "face-having-section lasting for unit division time (first certain period)" from a successive "face-having-section" lasting for a certain unit division time (here, 5 seconds) or more based on the number N of face detection regions (face regions) each where a face of person is detected included in the face detection information of the stream management information read from the recording medium A (step S102).

Here, if a unit division time is too long, this lengthens an integration time of face regions which will be described later, which prevents a moving image thumbnail from being enlarged and displayed in an effective manner. If a unit division time is too short, this finishes images of a moving image thumbnail in a short time, which prevents a user form easily perceiving contents. Thus, a provider or the like has to previously calculate a proper value (e.g., 5 seconds) based on actual measurement, and the provider, a user or the like has to previously set the proper value.

Figure 8:
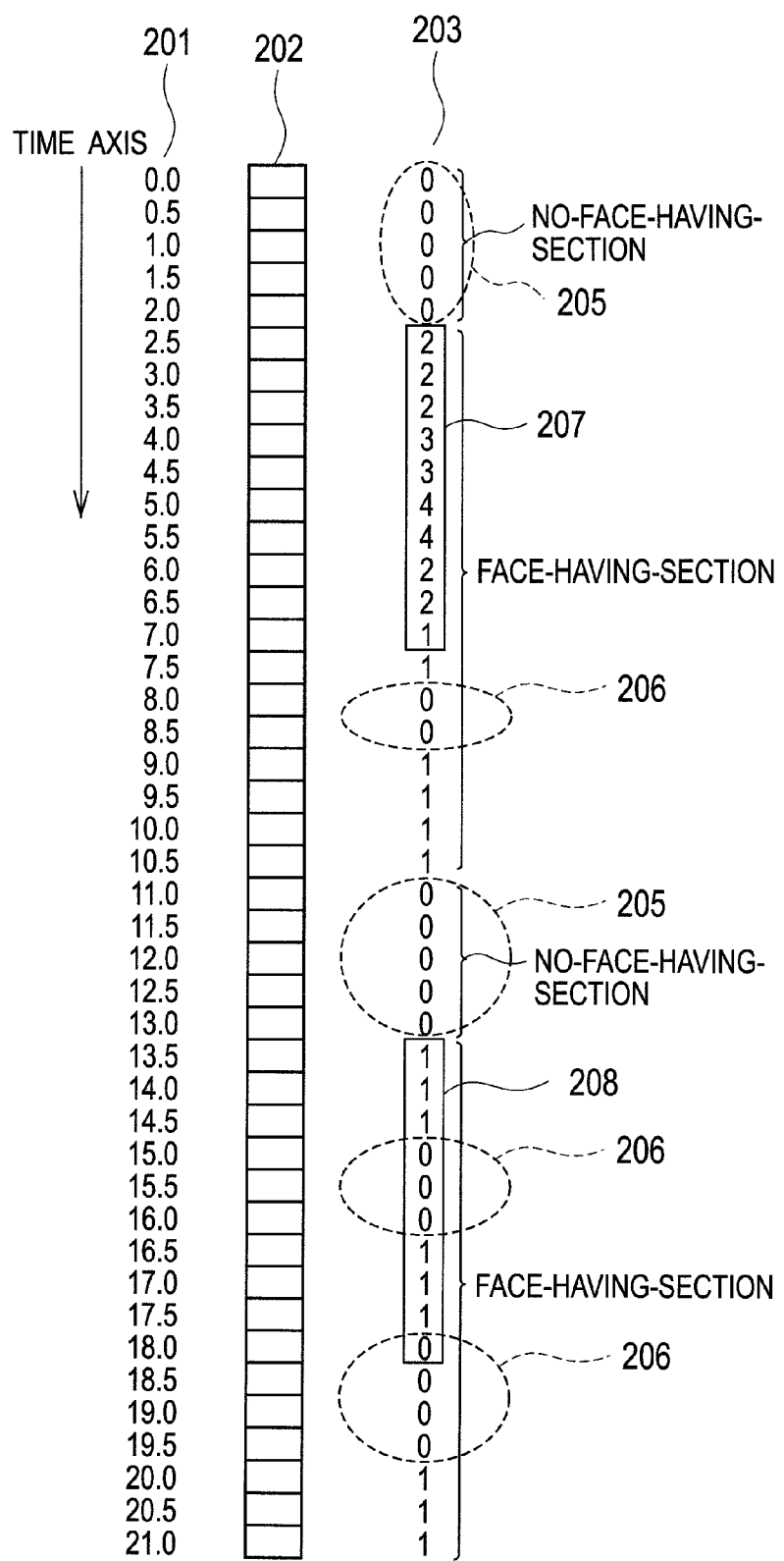

FIG. 8 illustrates processing in which the thumbnail section determining portion 20*d* determines a "face-having-section lasting for unit division time" and the moving image extracting portion 20*a* extracts the "face-having-section lasting for unit division time".

As shown in FIG. 8, the stream management information read from the recording medium A includes plural pieces of face detection information at intervals of the face detection time (0.5 seconds), and each piece of face detection information includes the number of face detection regions N each where a face of person is detected.

The thumbnail section determining portion 20*d* determines as "no-face-having-section" a section where a part in which the number of face detection regions N is "0" successively appears for more than four parts, that is where a face of person is not detected for more than two seconds, and determines another section as "face-having-section".

In the example shown in FIG. 8, a section 205 where a face of person is not detected for more than two seconds is determined as "no-face-having-section" and a section 206 where a face of person is not detected for two seconds or less is determined as "face-having-section".

Then, the moving image extracting portion 20*a* extracts a face-having-section lasting for unit division time (207 and 208) from among the face-having-section. It is noted that the total number of face-having sections each lasting for unit division time extracted by the moving image extracting portion 20*a* is called the number of extracted sections S.

Next, the moving image extracting portion 20*a* determines whether or not the number of extracted sections S is less than the number of reproduction sections of moving image thumbnail 103 based on the reproduction time of moving image included in the stream management information and the moving image thumbnail time information stored in the moving image thumbnail time storing unit 19 (step S104). More specifically, the moving image extracting portion 20*a* selects the number of reproduction sections of moving image thumbnail 103 according to the reproduction time of moving image included in the stream management information based on the moving image thumbnail time information stored in the moving image thumbnail time storing unit 19 shown in FIG. 5, and determines whether or not the number of extracted sections S is less than the selected number of reproduction sections of moving image thumbnail 103.

In step S104, if the number of extracted sections S is less than the number of reproduction sections of moving image thumbnail 103 (YES), the moving image extracting portion 20*a* determines whether or not there is a "face-having-section" lasting for less than unit division time except for the extracted "face-having-section lasting for unit division time" (step S105).

In step S105, if there is a "face-having-section" lasting for less than unit division time except for the extracted "face-having-section lasting for unit division time" (YES), the moving image extracting portion 20*a* extracts a "face-having-section" by the deficiency number from the beginning of moving image, except for the extracted "face-having-section lasting for unit division time" (step S106).

Then, the moving image extracting portion 20*a* adds the number of sections extracted in step S106 to the number of extracted sections S and sets it as the fixed number of extracted sections Sf (step S107).

In step S105, if there is not a "face-having-section" lasting for less than unit division time except for the extracted "face-having-section lasting for unit division time" (NO), the moving image extracting portion 20*a* assigns the number of extracted numbers S to the fixed number of extracted sections Sf (step S120).

On the other hand, in step S104, if the number of extracted sections S is equal to or more than the number of reproduction sections of moving image thumbnail 103 (NO), the moving image extracting portion 20*a* determines whether or not the number of extracted sections S is equal to the number of reproduction sections of moving image thumbnail 103 (step S108).

In step S108, the number of extracted sections S is equal to the number of reproduction sections of moving image thumbnail 103 (YES), the moving image extracting portion 20*a* assigns the number of extracted numbers S to the fixed number of extracted sections Sf (step S109).

On the other hand, in step S108, the number of extracted sections S is not equal to the number of reproduction sections of moving image thumbnail 103 (NO), the moving image extracting portion 20*a* calculates an average value of areas of face detection regions every "face-having-sections each lasting for unit division time" based on the size (width and height) of each face detection region where a face of person is detected included in the face detection information (step S110).

Next, the moving image extracting portion 20*a* sorts the extracted "face-having-sections each lasting for unit division time" in descending order of the average value of areas of face detection regions calculated in step S110 (step S111).

Then, the moving image extracting portion 20*a* selects "face-having-sections each lasting for unit division time" starting from the largest by the number of reproduction sections of moving image thumbnail 103, from among the "face-having-sections each lasting for unit division time" sorted in step S111 (step S112).

Next, the moving image extracting portion 20a assigns the number of reproduction sections of moving image thumbnail 103 to the fixed number of extracted sections Sf (step S113).

Thus, since sections each where an average values of areas of face detection regions is large are preferentially selected from among the "face-having-sections each lasting for unit division time", sections each where a face of person is largely captured are preferentially selected.

As described above, by carrying out the moving image extracting processing, the thumbnail generating apparatus 1 according to the first exemplary embodiment of the present invention can extract a moving image (frames) of a reproduction time of moving image thumbnail, which is not longer than a reproduction time of moving image, from a moving image in which a frame where a face of person is not detected in succession for a certain period of time is removed, based on the reproduction time of moving image, the number of face detection regions each where a face of person is detected at intervals of a face detection time, and the size (width and height) of face detection region where a face of person is detected.

Thereby, in order to generate a moving image thumbnail corresponding to a still image thumbnail selected, frames constituting proper sections can be extracted from among frames constituting an moving image stored in the recording medium A.

<Moving Image Thumbnail Generating and Displaying Processing>

Moving image thumbnail generating and displaying processing of the thumbnail generating apparatus 1 according the first exemplary embodiment of the present invention will be described in detail.

Figure 9:
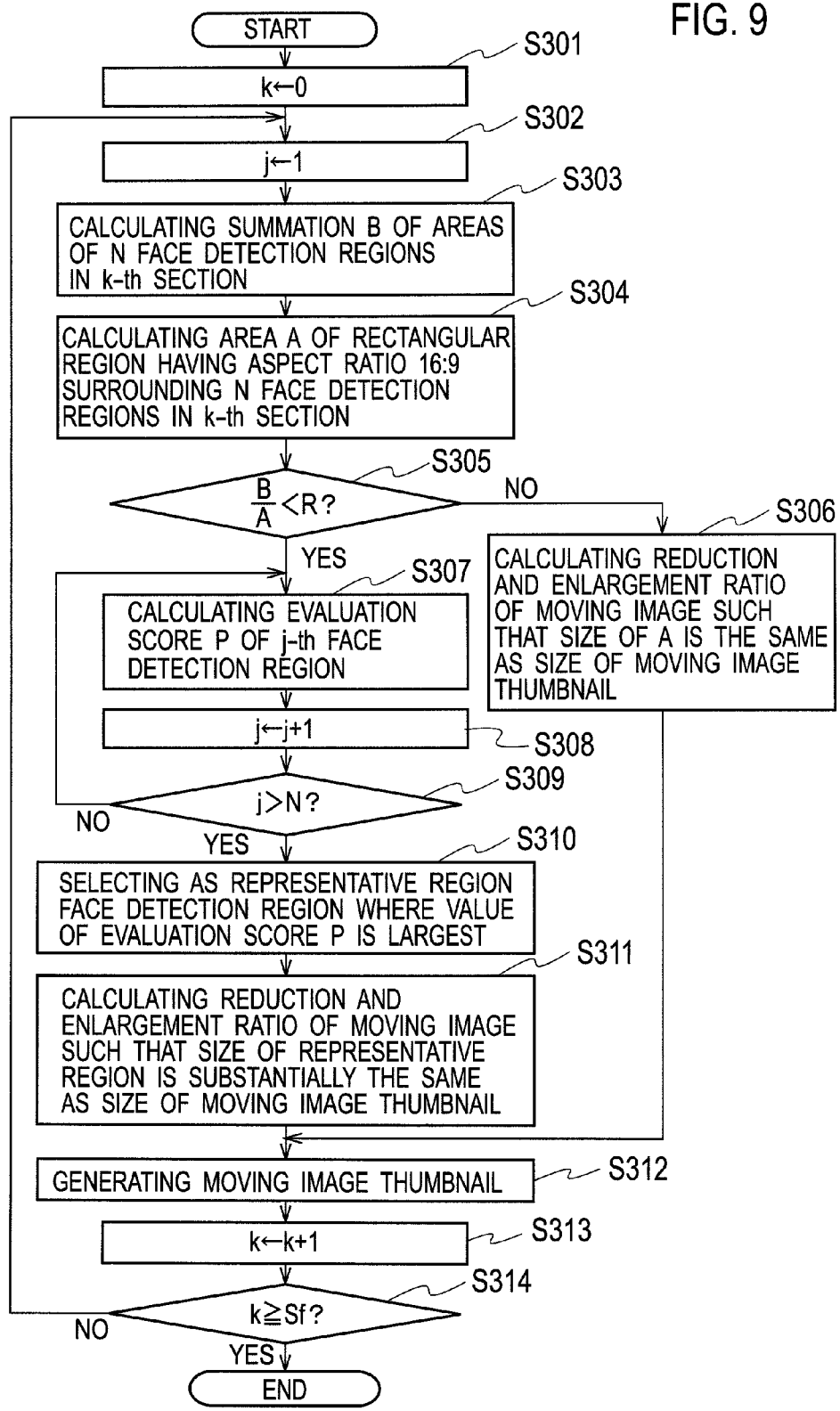

FIG. 9 is a flowchart that illustrates moving image thumbnail generating and displaying processing in the thumbnail generating apparatus 1 according to the first exemplary embodiment of the present invention.

First, the reduction and enlargement ratio calculating portion 20b of the CPU 20 assigns "0" to a value of counter k for a section as an initial value (step S301), and assigns "1" to a value of counter j for a face detection region as an initial value (step S302).

Next, the reduction and enlargement ratio calculating portion 20b of the CPU 20 calculates the summation "B" of areas of face detection regions (face regions) based on the size (width and height) of each face detection region in the k-th section of "face-having-sections" extracted by the fixed number of extracted sections Sf, included in the face detection information (step S303).

Further, the reduction and enlargement ratio calculating portion 20b of the CPU 20 calculates an area "A" of rectangular region (face display region) having the same aspect ratio (16:9) as a moving image surrounding the face detection regions based on the coordinate (X, Y) of the upper left of each face detection region and the size (width and height) of each face detection region in the k-th section, included in the face detection information (step S304).

Figure 10:
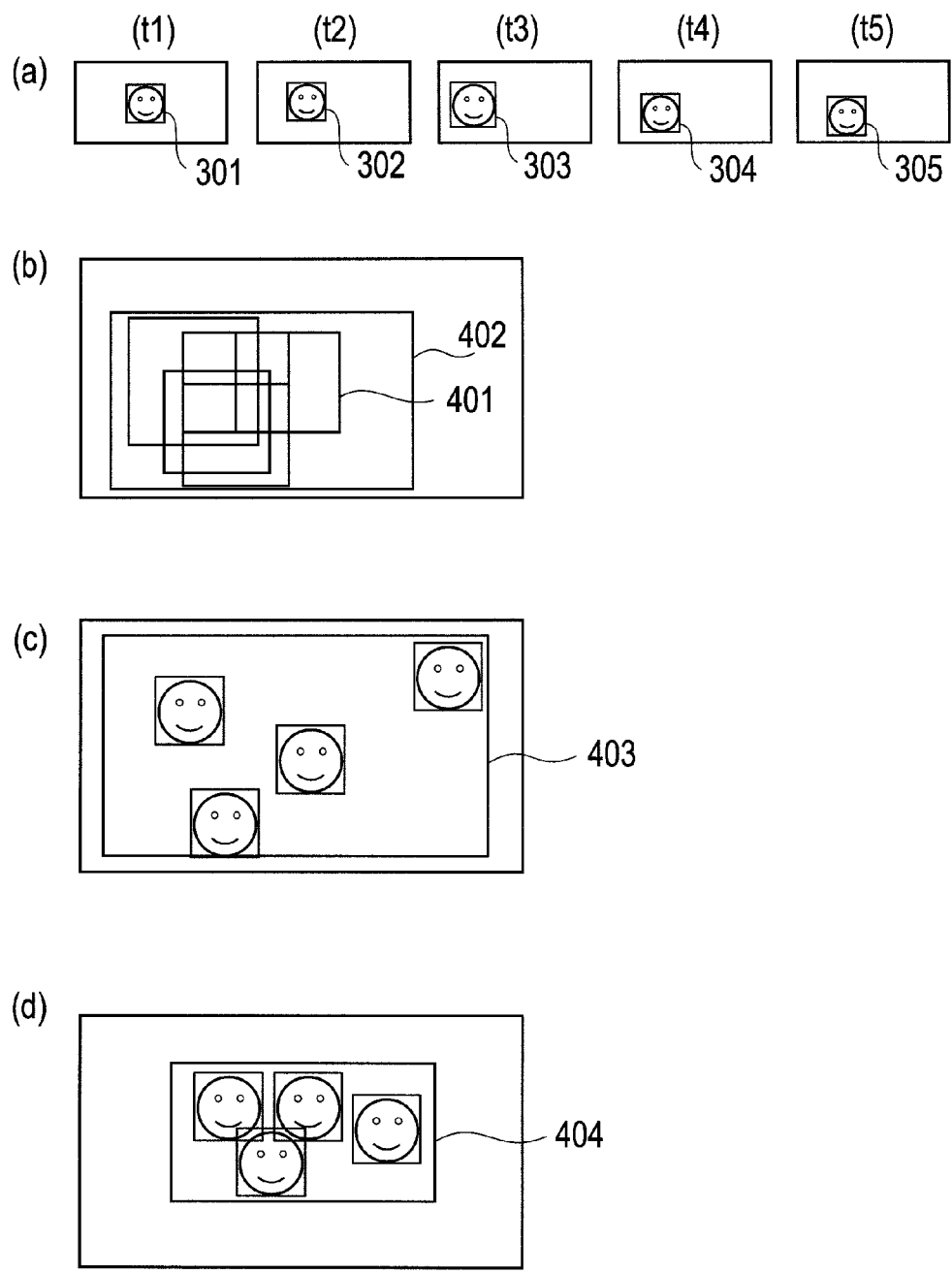

FIG. 10 is explanatory diagrams that illustrate calculation of the area "A" of rectangular region, which has the aspect ratio 16:9, surrounding the face detection regions by the reduction and enlargement ratio calculating portion 20b of the CPU 20 with which the thumbnail generating apparatus 1 is provided according to the first exemplary embodiment of the present invention. The (a) illustrates face detection regions during a certain section from a time point "t1" to a time point "t5". The (b) is a diagram of frame in a situation where the face detection regions shown in (a) are integrated. The (c) is a diagram in a situation where the face detection regions disperse in frames. The (d) is a diagram in a situation where the face detection regions thicken in frames.

As shown in FIG. 10(a), the positions of face detection regions 301 to 305 moves little by little at the time points "t1" to "t5" as time advances.

Then, when these face detection regions 301 to 305 are integrated, an integrated face detection region 401 is obtained as shown in FIG. 10(b).

Thus, the reduction and enlargement ratio calculating portion 20b calculates an area "A" of rectangular region 402, which has the aspect ratio (16:9), surrounding the integrated face detection region 401.

Since the reduction and enlargement ratio calculating portion 20b calculates an area "A" of rectangular region as described above, an area "A" of rectangular region 403 is large as shown in FIG. 10(c) in a case where the face detection regions 301 to 305 disperse in frames, and an area "A" of rectangular region 404 is small as shown in FIG. 10(d) in a case where the face detection regions 301 to 305 thicken in frames.

Next, the reduction and enlargement ratio calculating portion 20b of the CPU 20 determines whether or not the summation "B" of areas of face detection regions calculated in step S303 with respect to the area "A" of rectangular region calculated in step S304 is less than a predetermined threshold "R" (step S305).

Here, if the threshold "R" is too small, a moving image thumbnail can not be effectively enlarged and displayed because even if an area "A" of rectangular region is large, a reduction and enlargement ratio of a moving image is calculated such that the area of rectangular region has the same area as a moving image thumbnail as will be described below. Also, if the threshold "R" is too large, a moving image thumbnail can not be effectively enlarged and displayed because even if a user wants to enlarge respective face detection regions for a reason that a area "A" of rectangular region is small, a reduction and enlargement ratio of a moving image is calculated such that only one face detection region where an evaluation score "P" is the highest is enlarged.

In step S305, if the summation "B" of areas of face detection regions with respect to the area "A" of rectangular region is equal to or more than a predetermined threshold "R" (NO), the reduction and enlargement ratio calculating portion 20b calculates a reduction and enlargement ratio of a moving image such that the size (width and height) of rectangular region is the same as the size (width and height) of moving image thumbnail (step S306).

Figure 11:
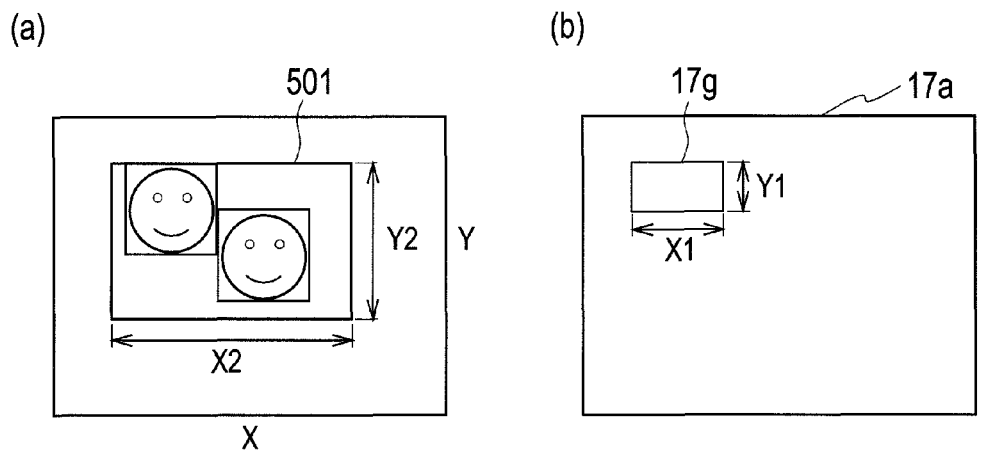

FIG. 11 is explanatory diagrams that illustrate calculation of a reduction and enlargement ratio of a moving image by the reduction and enlargement ratio calculating portion 20b with which the thumbnail generating apparatus 1 is provided according to the first exemplary embodiment of the present invention. The (a) illustrates one example of a frame of moving image to be reduced or enlarged. The (b) illustrates one example of the OSD frame 17a.

As shown in FIG. 11(a), the size of frame of moving image is X*Y (aspect ratio 16:9) and the size of rectangular region 501 is X2*Y2 (aspect ratio 16:9). As shown in FIG. 11(b), the size of moving image thumbnail in the OSD frame 17a, that is the size of highlight frame 17k is X1*Y1 (aspect ratio 16:9).

In this case, the reduction and enlargement ratio calculating portion 20b calculates a reduction and enlargement ratio of the moving image such that the size of rectangular region 501 is the same as the size of highlight frame 17k. Namely, if we assume that the reduction and enlargement ratio is "Q", the reduction and enlargement ratio "Q" is calculated according to the following equation 1.

$$Q = (X1/X) * (X1/X2) \quad \text{(equation 1)}$$

It is noted that a value of "X2" in (X1/X2) represents not the size of "X2" in a frame of an original moving image shown in FIG. 11(a) but instead the size of "X2" in a frame of a moving image adjusted to a moving image thumbnail shown in FIG. 11(b). Thus, since the reduction and enlargement ratio calculating portion 20b calculates a reduction and enlargement ratio of a moving image such that the size of rectangular region 501 is the same as the size of highlight frame 17k, if (X1/X2) is larger than (X1/X), a moving image looks like it is enlarged and displayed as a moving image thumbnail. However, an image in the moving image thumbnail is actually reduced or enlarged from the original moving image and then displayed.

On the other hand, in step S305 of FIG. 9, if the summation "B" of areas of face detection regions with respect to the area "A" of rectangular region is less than the predetermined threshold "R" (YES), the reduction and enlargement ratio calculating portion 20b calculates an evaluation score "P(j)" of the j-th face detection region in N face detection regions each where a face of person is detected in the k-th section according to the following equation 2 (step S307).

$$P(j) = \text{area of the } j\text{-th face detection region} - (\text{length between the center of screen and the center of the } j\text{-th face detection region}) 2 * 0.2 \quad \text{(equation 2)}$$

Then, the reduction and enlargement ratio calculating portion 20b adds "1" to the value of counter "j" (step S308), and then determines whether or not the value of counter "j" is larger than the number "N" of face detection regions each where a face of person is detected (step S309).

In step S309, if the value of counter "j" is larger than the number "N" of face detection regions each where a face of person is detected (YES), the reduction and enlargement ratio calculating portion 20b selects as a representative region a face detection region which is near the center of screen and has a large area, that is a face detection region where the value of evaluation score "P" is the largest, from among the N face detection regions each where a face of person is detected (step S310).

Next, the reduction and enlargement ratio calculating portion 20b calculates a reduction and enlargement ratio of moving image such that the size (width and height) of representative region selected in step S310 is substantially the same as the size (width and height) of moving image thumbnail (step S311).

Figure 12:
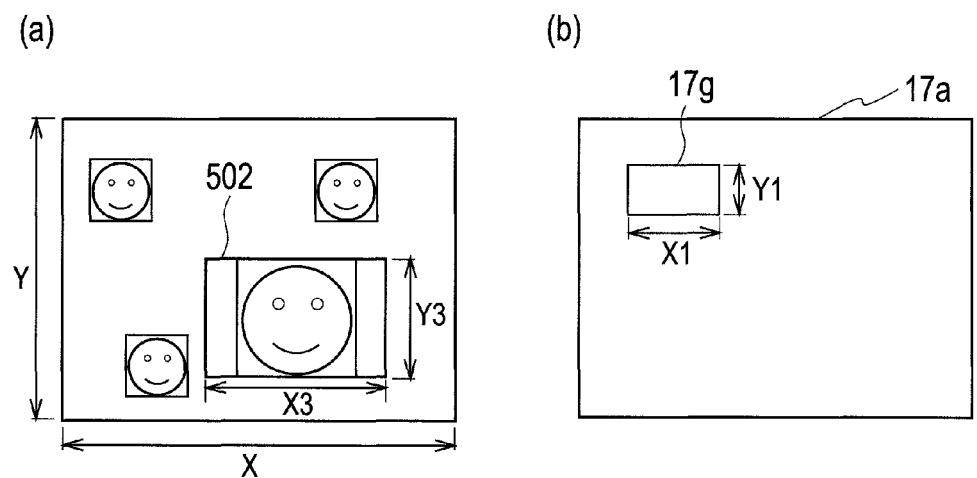

FIG. 12 is explanatory diagrams that illustrate calculation of a reduction and enlargement ratio of a moving image by the reduction and enlargement ratio calculating portion 20b with which the thumbnail generating apparatus 1 is provided according to the first exemplary embodiment of the present invention. The (a) illustrates one example of a frame of a moving image to be reduced or enlarged. The (b) illustrates one example of the OSD frame 17a.

As shown in FIG. 12(a), the size of frame of moving image is X*Y (aspect ratio 16:9) and the size of representative region 502 is X3*Y3 (aspect ratio 16:9). As shown in FIG. 12(b), the size of moving image thumbnail in the OSD frame 17a, that is the size of highlight frame 17k is X1*Y1 (aspect ratio 16:9).

In this case, the reduction and enlargement ratio calculating portion 20b calculates a reduction and enlargement ratio of the moving image such that the size of representative region 502 is the same as the size of highlight frame 17k. Namely, if we assume that the reduction and enlargement ratio is "Q", the reduction and enlargement ratio "Q" is calculated according to the following equation 1 in which "X2" and "Y2" are respectively replaced by "X3" and "Y3".

Thus, since the reduction and enlargement ratio calculating portion 20b calculates a reduction and enlargement ratio of the moving image such that the size (width and height) of representative region selected in step S310 is substantially the same as the size (width and height) of moving image thumbnail, it is easy to enlarge a face of person, which helps a user to perceive contents of a moving image easily.

Next, the reducing and enlarging unit 15 reduces or enlarges a moving image based on a reduction and enlargement ratio calculated by the reduction and enlargement ratio calculating portion 20b to generate a moving image thumbnail (step S312).

Thereby, the adder 16 to which image data for reproduction including the moving image thumbnail generated is supplied merges two frames based on OSD image data such that the OSD frame is overlapped with the moving image reproducing frame, and then displays the composite screen on the user interface 17.

Next, the reduction and enlargement ratio calculating portion 20b of the CPU 20 adds "1" to the value of counter k (step S313), determines whether or not the counter k is equal to or more than the fixed number of extracted sections Sf (step S314), and repeats the processing of steps S303 to S314 until the counter k is equal to or more than the fixed number of extracted sections Sf.

As described above, the thumbnail generating apparatus 1 according to the first exemplary embodiment of the present invention can generate and display a moving image thumbnail which helps a user to perceive contents of a moving image easily.

Although the first exemplary embodiment of the present invention describes as one example the thumbnail generating apparatus to which face detection information regarding a face of person detected is supplies from the video camera 101 via the medium A, generating a moving image thumbnail based on the face detection information supplied, it is not limited to this. The thumbnail generating apparatus may be connected to the video camera 101 via a network, and the thumbnail generating apparatus to which face detection information regarding a face of person detected from the video camera 101 via the network is supplied may generate a moving image thumbnail based on the face detection information supplied.

Second Exemplary Embodiment

The first exemplary embodiment describes as one example the thumbnail generating apparatus to which face detection information regarding a face of person detected is supplies via the recording medium A from the video camera 101 provided with the face detector detecting a face of person based on a moving image captured, reducing or enlarging the moving image to generate a moving image thumbnail based on the face detection information supplied. In addition, the thumbnail generating apparatus may reduce or enlarge the moving image to generate a moving image thumbnail based on facial feature information stored.

The second exemplary embodiment describes as one example a thumbnail generating apparatus to which face detection information regarding a face of person detected is supplies via the recording medium A from the video camera 101 provided with the face detector detecting a face of person based on a moving image captured, reducing or enlarging the moving image to generate a moving image thumbnail based on the face detection information supplied and facial feature information.

<Configuration of Video Camera 101>

Since a configuration of video camera 101 which records on the recording medium A an AV stream and stream management information to be supplied to the thumbnail generating apparatus according to the second exemplary embodiment of the present invention is the same as the configuration of the video camera 101 which records on the recording medium A an AV stream and stream management information to be supplied to the thumbnail generating apparatus 1 according to the first exemplary embodiment of the present invention, the explanation is omitted.

<Configuration of Thumbnail Generating Apparatus>

Figure 13:
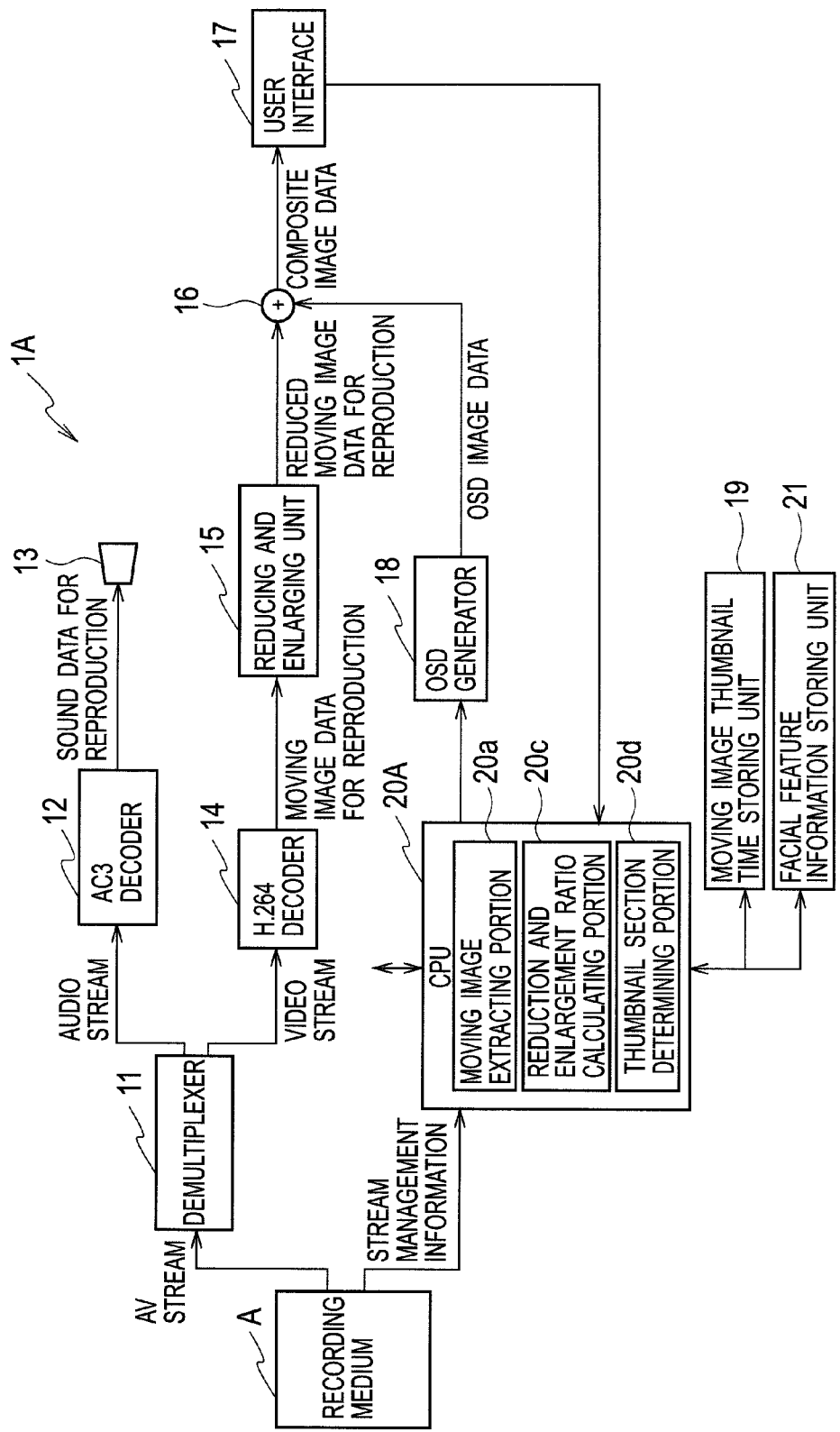

FIG. 13 is a configuration diagram that illustrates a configuration of the thumbnail generating apparatus 1A according to the second exemplary embodiment of the present invention.

As shown in FIG. 13, the thumbnail generating apparatus 1A according to the second exemplary embodiment of the present invention includes the demultiplexer 11, the AC3 decoder 12, the speaker 13, the H.264 decoder 14, the reducing and enlarging unit 15, the adder 16, the user interface 17, the OSD generator 18, a CPU 20A, the moving image thumbnail time storing unit 19 and a facial feature information storing unit 21.

Since the demultiplexer 11, the AC3 decoder 12, the speaker 13, the H.264 decoder 14, the reducing and enlarging unit 15, the adder 16, the user interface 17, the OSD generator 18, and the moving image thumbnail time storing unit 19 are the same as those to which the same reference numbers are assigned in the thumbnail generating apparatus 1 according to the first exemplary embodiment of the present invention, the explanation is omitted.

The facial feature information storing unit 21 associates an ID of person for uniquely identifying the person with feature information of the person's face, and then stores it as facial feature information.

Figures 14, 15:
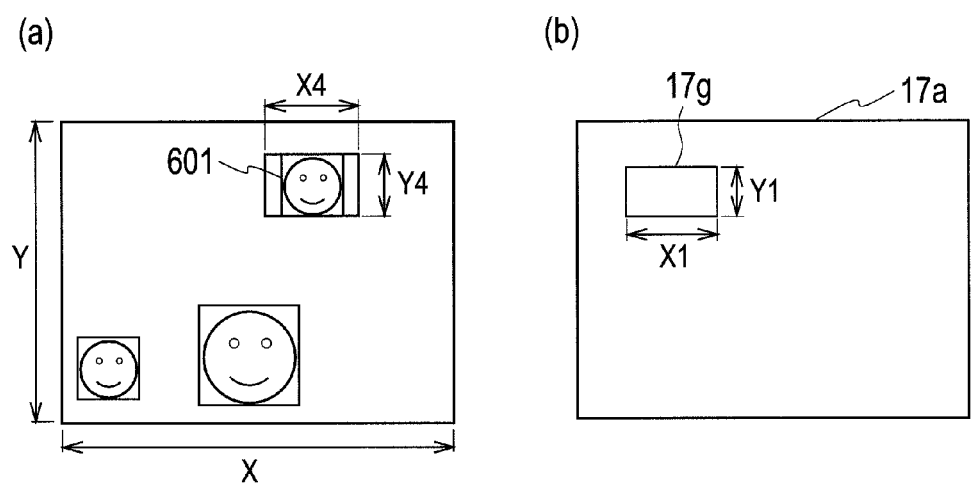

FIG. 14 illustrates one example of facial feature information stored in the facial feature information storing unit 21 with which the thumbnail generating apparatus 1A according to the second exemplary embodiment of the present invention is provided.

As shown in FIG. 14, a column name "ID of person" (reference number 601) and a column name "feature information" (reference number 602) are associated with each other and stored as facial feature information. It is noted that the facial feature information is information for representing a facial feature capable of uniquely identifying a face of person such as a size, a shape and the like of eyes, a nose, a mouth and the like.

The CPU 20A carries out central control of the thumbnail generating apparatus 1A. The CPU 20A includes a moving image extracting portion 20a and a reduction and enlargement ratio calculating portion 20c in function.

The moving image extracting portion 20a extracts frames of a moving image during a period which does not exceed a reproduction time of moving image thumbnail from among frames of the moving image in which frames during a period when a face is not successively detected for a predetermined time are eliminated, based on a reproduction time of moving image and the number of facial images detected at intervals of a face detection time.

If face detection information including facial feature information is supplied from the video camera 101, the reduction and enlargement ratio calculating portion 20c determines whether or not the facial feature information included in the face detection information supplied is the same as or similar to facial feature information stored in the facial feature information storing unit 21. If the facial feature information is the same as or similar to it, the reduction and enlargement ratio calculating portion 20c calculates a reduction and enlargement ratio of a moving image such that face detection region corresponding to the facial feature information being the same as or similar to it is maximized.

More specifically, the reduction and enlargement ratio calculating portion 20c selects as a registered face region a face detection region corresponding to the facial feature information being the same as or similar to it, and then calculates a reduction and enlargement ratio of the moving image such that the size of registered face region selected is substantially the same as the size of moving image thumbnail.

FIG. 15 is explanatory diagrams that illustrate calculation of a reduction and enlargement ratio of a moving image by the reduction and enlargement ratio calculating portion 20c with which the thumbnail generating apparatus 1A is provided according to the second exemplary embodiment of the present invention. The (a) illustrates one example of a moving image to be reduced or enlarged. The (b) illustrates one example of the OSD frame.

As shown in FIG. 15(a), the size of frame of moving image is X*Y (aspect ratio 16:9) and the size of registered face region 601 is X4*Y4 (aspect ratio 16:9). As shown in FIG. 15(b), the size of moving image thumbnail in the OSD frame 17a, that is the size of highlight frame 17k is X1*Y1 (aspect ratio 16:9).

In this case, the reduction and enlargement ratio calculating portion 20b calculates a reduction and enlargement ratio of the moving image such that the size of registered face region 601 is the same as the size of highlight frame 17k. Namely, if we assume that the reduction and enlargement ratio is "Q", the reduction and enlargement ratio "Q" is calculated according to the following equation 1 in which "X2" and "Y2" are respectively replaced by "X4" and "Y4".

Thus, since the reduction and enlargement ratio calculating portion 20c calculates a reduction and enlargement ratio of the moving image such that the size of registered face region selected is substantially the same as the size of moving image thumbnail, it is easy to enlarge a face of person recorded. Thereby, it is easy for a user to watch a face image of a desired person's face, which helps the user to perceive contents of a moving image easily.

As described above, since the thumbnail generating apparatus 1A according to the second exemplary embodiment of the present invention includes the facial feature information storing unit 21 and the reduction and enlargement ratio calculating portion 20c, it is possible to preferentially enlarge one or more persons previously registered and display it as a moving image thumbnail, in addition to the effect of the thumbnail generating apparatus 1 according to the first exemplary embodiment of the present invention.

In the second exemplary embodiment, in a case where a face which is the same as a facial feature previously stored is detected from among faces being detected, if only the face which is the same as it is set as processing object, a face of only user's children can be enlarged and displayed as a moving image thumbnail in a moving image in which the user's children is captured together with another person's children, for example.

Reference Signs List 1, 1A . . . thumbnail generating apparatus
11 . . . demultiplexer
12 . . . AC3 decoder 13 ... speaker
14 ... H.264 decoder
15 ... reducing and enlarging unit
16 ... adder
17 ... user interface
17a ... image display region
17b ... operation buttons
17c ... slider
17d ... thumbnail display region
17e ... operation guide display region
17f ... page display region
17g ... image display region
17k ... highlight frame
17h ... moving image reproducing frame
17j ... moving image thumbnail
18 ... OSD generator
19 ... moving image thumbnail storing time
20, 20A, 131 ... CPU
20a ... moving image extracting portion
20b, 20c ... reduction and enlargement ratio calculating portion
20d ... thumbnail section determining portion
21 ... facial feature information storing unit
101 ... video camera
111 ... optical lens
112 ... imaging elements
113 ... signal processor
114 ... H.264 encoder
115 ... multiplexer
116 ... face detector
117 ... adder
121 ... microphone
122 ... A/D converter
123 ... AC3 encoder

The invention claimed is:

1. A thumbnail generating apparatus comprising:
a moving image extracting portion that, within a first certain period of a moving image, extracts each of the images constituting the moving image every a second certain period shorter than the first certain period;
a reduction and enlargement ratio calculating portion that integrates each region where there is a face of person included in the images extracted within the first certain period, determines a face display region to be used in common with the first certain period and having the same aspect ratio as the moving image extracted by the moving image extracting portion such that the face display region surrounds each of the integrated regions where there is a face of a person, and calculates a reduction and enlargement ratio of the moving image such that the determined face display region has substantially the same size as a certain display region having the same aspect ratio as the moving image extracted by the moving image extracting portion and previously set where a moving image thumbnail is to be displayed; and
a moving image thumbnail generator that reduces or enlarges the moving image based on the calculated reduction and enlargement ratio to generate the moving image thumbnail.

2. The thumbnail generating apparatus according to claim 1, further comprising a thumbnail section determining portion that determines one or more first certain periods based on the number of successive images each of which has a region where there is a face of person, among the images extracted by the moving image extracting portion.

3. The thumbnail generating apparatus according to claim 2, wherein the reduction and enlargement ratio calculating portion that, if a value of ratio calculated by setting as denominator a value of area of the face display region and setting as numerator a value of total area of each of the regions where there is a face of person is smaller than a certain threshold, the reduction and enlargement ratio calculating portion sets as a representative region a region where there is a face of person, which is located near the center and has the largest area among each of the regions where there is a face of person, and calculates the reduction and enlargement ratio such that the representative region has substantially the same size as the display region.

4. The thumbnail generating apparatus according to claim 2, further comprising a facial feature information storing unit that stores as facial feature information a facial feature for uniquely identifying a face of person,
wherein the reduction and enlargement ratio calculating portion determines whether or not a facial feature in each of the regions where there is a face of person is the same as or similar to a facial feature represented by the facial feature information stored in the facial feature information storing unit, and if the facial feature is the same as or similar to the facial feature represented by the facial feature information, the reduction and enlargement ratio calculating portion calculates the reduction and enlargement ratio such that a region where there is a face of person corresponding to the facial feature being the same as or similar to the facial feature represented by the facial feature information has substantially the same size as the display region.

5. The thumbnail generating apparatus according to claim 1, wherein the reduction and enlargement ratio calculating portion that, if a value of ratio calculated by setting as denominator a value of area of the face display region and setting as numerator a value of total area of each of the regions where there is a face of person is smaller than a certain threshold, the reduction and enlargement ratio calculating portion sets as a representative region a region where there is a face of person, which is located near the center and has the largest area among each of the regions where there is a face of person, and calculates the reduction and enlargement ratio such that the representative region has substantially the same size as the display region.

6. The thumbnail generating apparatus according to claim 1, further comprising a facial feature information storing unit that stores as facial feature information a facial feature for uniquely identifying a face of person,
wherein the reduction and enlargement ratio calculating portion determines whether or not a facial feature in each of the regions where there is a face of person is the same as or similar to a facial feature represented by the facial feature information stored in the facial feature information storing unit, and if the facial feature is the same as or similar to the facial feature represented by the facial feature information, the reduction and enlargement ratio calculating portion calculates the reduction and enlargement ratio such that a region where there is a face of person corresponding to the facial feature being the same as or similar to the facial feature represented by the facial feature information has substantially the same size as the display region.

7. A thumbnail generating method comprising:
a moving image extracting step of, within a first certain period of a moving image, extracting from non-transitory stored image data each of the images constituting the moving image every a second certain period shorter than the first certain period;

a reduction and enlargement ratio calculating step of integrating each region where there is a face of person included in the images extracted within the first certain period, determining a face display region to be used in common with the first certain period and having the same aspect ratio as the moving image extracted by the moving image extracting portion such that the face display region surrounds each of the integrated regions where there is a face of person, and calculating a reduction and enlargement ratio of the moving image such that the determined face display region has substantially the same size as a certain display region having the same aspect ratio as the moving image extracted by the moving image extracting portion and previously set where a moving image thumbnail is to be displayed; and a moving image thumbnail generating step of reducing or enlarging the moving image based on the calculated reduction and enlargement ratio to generate the moving image thumbnail.

* * * * *